UNITED STATES PATENT OFFICE 2,498,281

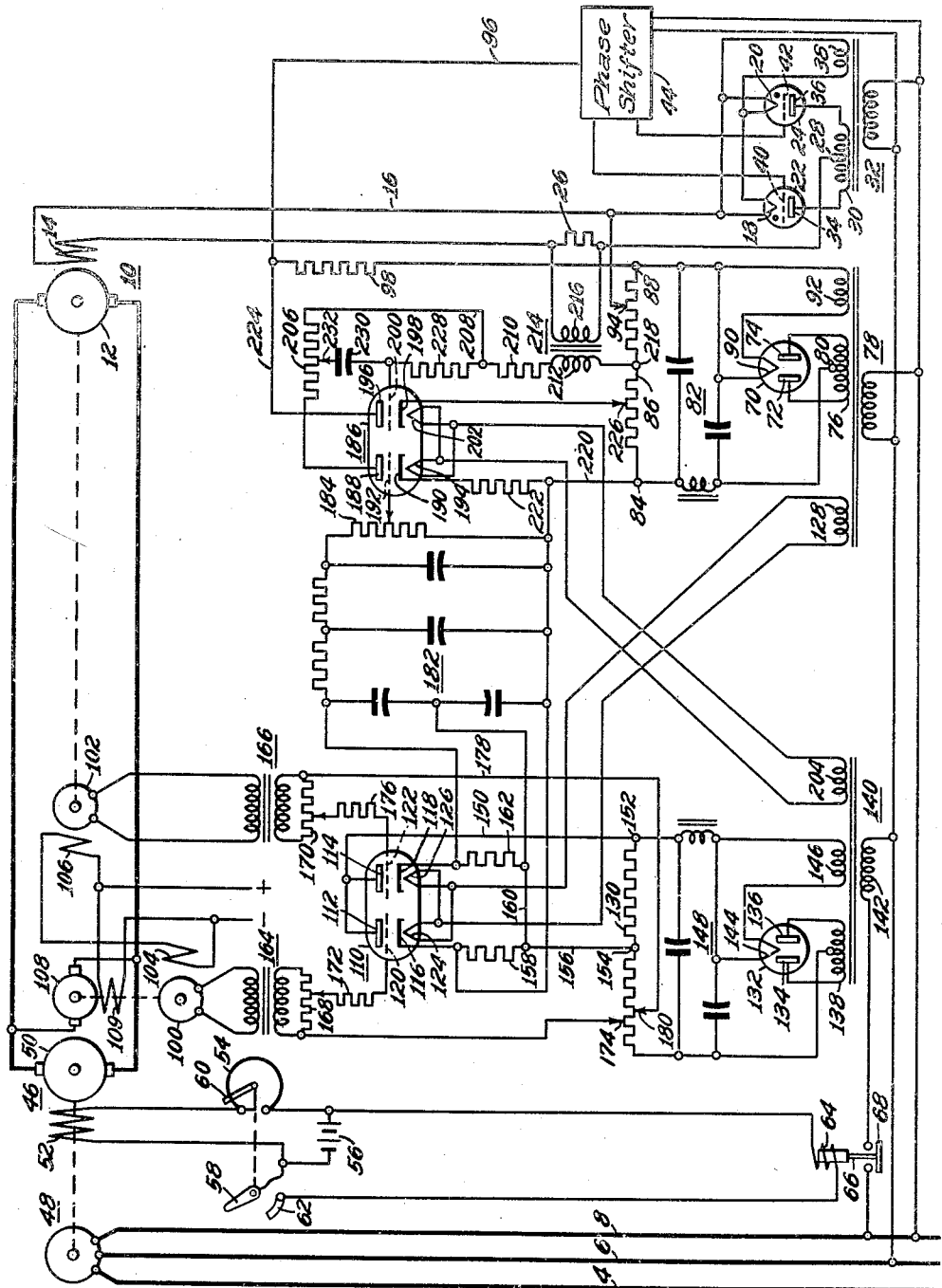

SPEED REGULATING SYSTEM

Joseph F. Kovalsky, Buffalo, N. Y., assignor to Westinghouse Electric Corporation, East Pittsburgh, Pa., a corporation of Pennsylvania Application October 30, 1947, Serial No. 783,098

7 Claims. (Cl. 318—356)

This invention relates to regulating systems and in particular to speed regulating systems of the electronic type.

In systems involving speed regulation of motors, it is necessary to be able to start the motor with maximum field excitation in order to produce a high starting torque. In the previous known systems, the speed regulator is connected in operating relation as the motor approaches the predetermined speed which is to be maintained but since the speed is below that value, the regulator functions to reduce the field excitation to a minimum and maintain such minimum value until the speed reaches the predetermined value which is to be maintained. Such operation effects a violent swing of speed of the motor with resultant excessive armature current which may flash over the commutator and also cause a severe jar in the armature and associated gears and pulleys of the equipment being driven.

An object of this invention is to provide a speed regulating system which can be so connected in operating relation with a motor as to give a smooth acceleration of the motor to a predetermined speed.

Another object of this invention is to provide, in a speed regulator system for a motor, for connecting the regulating system for operation at a predetermined speed of the motor and for maintaining full field excitation of the motor for a predetermined period of time after the system is connected for operation to permit a smooth acceleration of the speed of the motor to a predetermined value which is to be maintained and thereafter maintaining a sensitive, quick responsive regulation of the speed of the motor.

A further object of this invention is the provision of an electronic speed regulating system which has an initial time delay when connected for operation to regulate the speed of a motor to permit a smooth acceleration of the speed of the motor to a predetermined value which is to be maintained and to thereafter provide a fast and sensitive regulation of the speed of the motor.

Other objects of this invention will become apparent from the following description when taken in conjunction with the accompanying drawing, the single figure of which is a diagrammatic view of a system and apparatus embodying the teachings of this invention.

Referring to the drawing, there is illustrated a motor 10 the speed of which is to be regulated. The motor 10 may be one of the drives of a paper mill or other apparatus in which the speed of the motor must be maintained at a predetermined value and comprises the armature windings 12 and the separately excited field windings 14.

In this instance, the field windings 14 are connected at one end by conductor 16 to the cathodes 18 and 20 of rectifier valves 22 and 24, respectively, the other end of the field windings being connected through a resistor 26 to the mid-terminal 28 of a secondary winding 30 of a power transformer 32, the ends of the secondary winding 30 being connected to the anodes 34 and 36 of the valves 22 and 24, respectively. The cathodes 18 and 20 of the valves 22 and 24, respectively, are also connected through a secondary winding 38 of transformer 32 to provide a source of heat for the cathode filaments. The valves 22 and 24 are also provided with control grids 40 and 42, respectively, which are connected through a suitable phase shifter 44 to a source of alternating current, provision being made for superimposing a direct-current biasing potential on the fixed phase shifted potential for controlling the conductivity of the valves 22 and 24 as will be more fully described hereinafter.

As illustrated, the armature windings 12 are connected to be supplied by a generator 46 which is driven by a motor 48 connected across the supply conductors 4, 6 and 8. The generator 46 is provided with armature windings 50 and field windings 52 which in this instance are disposed to be connected through a field rheostat 54 to a source of supply such at the battery 56. Associated with the field rheostat 54 is an auxiliary switch 58 disposed for movement simultaneously with the arm 60 of the rheostat so that when the arm 60 is actuated to connect only a predetermined minimum section of the rheostat in circuit with the field windings 52, the switch 58 engages a fixed contact member 62 to establish an energizing circuit to the energizing winding 64 of a contactor 66 which is provided with a bridging contact member 68.

When the motor 10 is first started, it is desired that full excitation be provided. Thus in order to supply a maximum and predetermined positive direct-current biasing potential for the power supply valves 22 and 24, a full wave rectifier valve 70 is disposed with its anodes 72 and 74 connected to the ends of a secondary winding 76 of a supply transformer 78, the mid-terminal 80 of the secondary winding 76 being connected through a filter circuit 82 to one end 84 of a sectionalized potentiometer 86, the other end 88 of which is also connected through the filter circuit to the cathode 90 of the valve 70. As illustrated, the cathode 90 is also connected to the secondary winding 92 of transformer 78 for supplying heating current to the cathode filament. Thus a section of the potentiometer 86 between the end 88 and an adjustable contact member 94 is connected in the grid-cathode circuits of the rectifier valves 22 and 24, such circuits extending from the grids 40 and 42 to the phase shifter 44, conductor 96, resistor 98, through the section of the potentiometer 86 between the end or terminal 88, and the adjustable contact member 94 and conductor 16 to the cathodes 18 and 20. The direct-current biasing potential thus impressed on the phase shifted alternating current potential on the grid-cathode circuits of valves 22 and 24 from the source represented by the section or potentiometer 86 between the terminal 88 and contact member 94 is positive and is of sufficient value to render the valves 22 and 24 conducting for a maximum period to provide maximum field excitation for the motor 10.

In order to provide for controlling the direct-current biasing potential impressed on the grids of the power supply valves 22 and 24 as the speed of the motor varies, provision is made for balancing a "cue" voltage which is a measure of the speed of the motor 10 against a "reference" or fixed voltage and for employing the net balance to control the operation of an amplifier, the output of which is impressed on the grid-cathode circuits of valves 22 and 24 in opposition to the direct-current biasing potential impressed thereon from the constant source represented by the section of potentiometer 86 connected between terminal 88 and the adjustable tap or contact member 94.

As illustrated, the reference voltage is provided by a tachometer generator 100 and the cue voltage is provided by a tachometer generator 102, each of which is of the alternating-current type and is provided with a field winding 104 and 106, respectively, disposed to be energized by a constant source of direct-current energy. The tachometer generator 100 is disposed to be driven by a direct-current motor 108 which is connected across the output terminals of generator 46, the field windings 109 of the motor 108 also being connected to be energized in the same manner as series connected field windings 104 and 106 of the tachometer generators. The tachometer generator 102 is disposed to be driven by the motor 10 so that the output of the generator 102 is a direct measure of the speed of the motor 10.

By connecting the tachometer generators 100 and 102 in this manner, it is apparent that any variation in the speed of the motor 10 and the speed of the generator 102 driven thereby occasioned by a variation in voltage impressed across the armature windings 12 of the motor 10 is also reflected in the speed of the tachometer generator 100 since the driving motor 108 therefor is also connected across the generator 46 which supplies the armature windings 12. Thus the output of the tachometer generators 100 and 102 is varied simultaneously due to voltage fluctuations from the generator 46 to maintain a given relationship between the output of the tachometer generators 100 and 102.

In order to measure unbalance between the output of the tachometer generators 100 and 102, they are connected to control the operation of a twin triode vacuum valve 110. The valve 110 may be of the 6SN7 type and is provided with a pair of anodes 112—114, a pair of cathodes 116—118, a pair of grids 120—122 and a pair of heater filaments 124—126, the latter being connected across a secondary winding 128 of transformer 78. The respective pairs of anode-cathodes are connected in circuit with a section of a potentiometer resistor 130 which constitutes a source of power.

The resistor 130 is connected to be supplied by a rectifier valve 132, the anodes 134 and 136 of which are connected to the ends of a secondary winding 138 of a power transformer 140, the primary winding 142 of which is disposed to be energized from conductors 6 and 8 only when the contactor 66 is energized to actuate its contact member 68 to a circuit closing position. The cathode 144 of the rectifier valve is connected to be heated from a secondary winding 146 of the transformer 140. Thus by connecting the anodes 134 and 136 and the cathode 144 through a filter circuit 148 across the potentiometer resistor 130 as illustrated, a source of supply of direct current is provided for the valve 110.

The anode-cathode circuits of the twin triode valve 110 thus extend from the anodes 112 and 114 through conductor 150, end terminal 152 of potentiometer resistor 130 to the fixed tap 154, conductor 156 and from thence through resistor 158 to cathode 116 and through conductor 160 and resistor 162 to cathode 118, respectively. The conductivity of the respective anode-cathode circuits of valve 110 thus determined the current flow through each of resistors 158 and 162.

In order to supply a direct-current biasing potential for the grid-cathode circuits of valve 110, a section of the potentiometer resistor 130 is also connected in the respective grid-cathode circuits. The output of the tachometer generators 100 and 102 as supplied to transformers 164 and 166 and impressed across resistors 168 and 170, respectively, is also utilized as the alternating-current biasing potential for the grids 120 and 122, respectively, to control the conductivity thereof. Thus the grid-cathode circuit for the first section of valve 110 extends from the grid 120 through resistors 172 and 168 to the adjustable contact member 174 of potentiometer resistor 130, the section of potentiometer resistor 130 between the adjustable contact member 174 and the fixed terminal 154, conductor 156 and resistor 158 to the cathode 116. Similarly, the grid-cathode circuit for the second section of the valve 110 extends from the grid 122 through resistors 176 and 170, conductor 178, adjustable contact member 180, the section of potentiometer resistor 130 between contact member 180 and fixed tap 154, conductors 156 and 160 and resistor 162 to the cathode 114.

The output of the twin sections of the valve 110 as measured across resistors 158 and 162 is thus a direct measure of the reference voltage produced by the tachometer generator 100 and the cue voltage of tachometer generator 102 which is a measure of the speed of the motor 10. By connecting the resistors 158 and 162 across a filter circuit 182 so that their polarities are opposing as illustrated, a net voltage is obtained across resistor 184 which is a measure of unbalance between the reference voltage and the cue voltage of the tachometer generators 100 and 102, respectively. Thus if the reference voltage and the cue voltage are in balance, zero voltage is obtained across resistor 184.

As illustrated, the unbalance between the reference voltage and the cue voltage is employed in the normal operation of the system for controlling the operation of another twin triode vacuum valve 186 of the amplifier type 6SL7. The valve 186 is also formed of two sections, one section comprising an anode 188, a cathode 190, a grid 192 and a heater filament 194 and the other section comprising an anode 196, a cathode 198, a grid 200 and a heater filament 202. The heater filaments 194 and 202 are connected across a secondary winding 204 of power transformer 140 so that the filaments are heated only when the contactor 66 is energized to actuate its contact member 68 to a circuit closing position.

The anode-cathode circuits of the two sections of valve 186 are connected in circuit relation with the source of direct-current power represented by the potentiometer resistor 86 referred to hereinbefore, the circuit for the first section extending from the anode 188 through resistor 206, conductor 208, resistor 210, the secondary winding 212 of a damping transformer 214, the primary winding 216 of which is connected across resistor 26 in the field winding circuit of motor 10, to a fixed tap 218, through the section of potentiometer resistor 86 between tap 218 and terminal 84, conductor 220 and the self-biasing resistor 222 to the cathode 190. The anode-cathode circuit of the second section of valve 186 may also be traced from the anode 196 through conductor 224, resistor 98 to terminal 88 of potentiometer resistor 86, through a section of resistor 86 to the adjustable tap 226 thereof and from thence to the cathode 198.

The grid-cathode circuit for the first section of the valve 186 extends from the grid 192 through a part of resistor 184 and the self-biasing resistor 222 to the cathode 190. The grid-cathode circuit of the second section of the valve 186 extends from grid 200 through resistors 228 and 210, the secondary winding 212 of the damping transformer 214, the fixed tap 218 and the section of the potentiometer resistor 86 between the tap 218 and the adjustable contact member 226 to the cathode 198. Thus the bias of the second section grid 200 is controlled, not only by the direct-current bias impressed on the grid-cathode circuit by the source represented by the potentiometer resistor 86 but also by the potential across resistor 210 occasioned by the flow of current therethrough in the anode-cathode circuit of the first section of valve 186 and by any potential impressed on the circuit by reason of the damping transformer 214 which functions in a normal manner dependent upon a change in the excitation of the field winding of the motor 10 in anticipation of a corrective action.

As illustrated, a capacitor 230 is also connected between resistor 228 and a mid-terminal 232 of resistor 206 to provide an alternate anode-cathode circuit for the first section of valve 186 which is employed for giving a fast biasing action for grid 200 under predetermined conditions of change in balance between the reference voltage and the cue voltage referred to hereinbefore. Thus if the voltages are balanced or if the change in the net balance impressed on resistor 184 is a slow steady change, then the normal output circuit of the first section of valve 186 by-passes the series connected resistor 228 and capacitor 230 to affect the grid bias to give an amplification sufficient to control the bias of the valves 22 and 24 to effect the necessary correction in the speed of the motor 10. However, if the change in the net balance of the voltages from the two sections of valve 110 is such as to be a measure of a rapid change in speed of the motor, then the output circuit of the first section of valve 186 employs the alternate path formed of the capacitor 230 and resistor 228 to impress a large but momentary positive bias on the grid 200 to give a large momentary amplification and thereby effect a large momentary corrective change in the excitation of the motor 10.

In operation in starting the system, the system is connected as illustrated with the primary windings of the power transformers 78 and 32 energized from a suitable source of supply represented by conductors 6 and 8 and with the contactor 66 in the deenergized position. With the contactor 66 deenergized, neither of the twin triode vacuum valves 110 or 186 are energized as the power source for the valve 110 is deenergized and the source of supply for the heating filaments of the valve 186 is also deenergized.

With the power transformers 78 and 32 thus energized, power is supplied to the field winding 14 of the motor 10 through the rectifier valves 22 and 24 and a source of positive direct-current biasing voltage is provided by reason of the action of the rectifier valve 70 in passing current through the potentiometer resistor 86. By adjusting the contact member 94 on the potentiometer resistor 86, a maximum positive direct-current bias is impressed on the grid cathode circuits of the rectifying valves 22 and 24 so that maximum conductivity of such valves is obtained to provide maximum field excitation for the motor 10. This is necessary in order to obtain maximum field voltage and maximum torque in the starting of the motor 10.

In bringing the speed of the motor 10 up to a predetermined speed, the voltage across the output terminals of the generator 46 is controlled by increasing the flow of current through the field winding 52. In this instance, the field current for the generator 46 is controlled by actuating the arm 60 of the field rheostat 54 to reduce the sections of the rheostat connected in circuit therewith, movement of the arm 60 effecting a simultaneous movement of the auxiliary switch 58. As the voltage across the generator 46 reaches a predetermined value sufficient to effect the operation of the motor 10 at a speed closely approximating the speed which is to be maintained, the switch 58 engages the fixed contact member 62 to establish a circuit to the energizing winding 64 of the contactor 66 to actuate the contact member 68 thereof to a circuit-closing position. Of course it is to be appreciated that the motor 108 driving the tachometer generator 100 is energized in accordance with the voltage across the generator 46 and that the tachometer generator 102 is driven in accordance with the speed of the motor 10 to impress voltage across transformer 164 and 166, respectively.

When the contact member 68 of the contactor 66 is thus actuated to a circuit-closing position, the primary windings 142 of the power transformer 140 are connected to a source of power supply to energize the secondary windings 138, 146 and 204 of the power transformer 140, whereby the rectifier valve 132 functions in a well-known manner to effect a flow of direct current through the potentiometer resistor 130 and thereby provide a source of power supply for the twin triode valve 110, the secondary windings 204 of the power transformer providing a source of power for effectively heating the filaments 194 and 202 of the twin triode valve 186.

As will be appreciated, the direct-current bias for the grids 120 and 122 of the valve 110 can be adjusted by adjusting the movable contact members 174 and 180, respectively, and the alternating-current biasing potential for each of the grids can be adjusted by adjusting the movable contact members of the resistors 168 and 170, respectively.

Since the heater filaments 124 an 126 of the valve 110 are connected to a source of supply through the secondary winding 128 of power transformer 78 when the system is initially energized, the valve 110 is rendered conductive as soon as the power source therefore is provided by energizing the power transformer 140. Thus the twin sections of the valve 110 are rendered conducting depending upon the alternating-current biasing voltage impressed on the grids 120 and 122 by reason of the operation of the tachometer generators 100 and 102, respectively. Since the reference voltage resulting from the tachometer generator 100 is constant and the speed of the motor 10 is increased to a predetermined speed, and the resulting voltage of the tachometer generator 102 is therefore less than the voltage which will be obtained when the motor 10 is operated at the predetermined speed, the first section comprising the anode 112, cathode 116 and grid 120 of the valve 110 will be rendered more conducting than the second section including the anode 114 and cathode 118 of the valve 110. Thus more current will pass through the resistor 158 connected in the anode-cathode circuit of the first section than will pass through the resistor 162 connected in the anode-cathode circuit of the second section of valve 110 and since the resistor sections 158 and 162 are connected in opposition with the filter circuit 182, a net voltage results across the resistor 184 having a polarity for providing a positive direct-current biasing voltage for the grid 192 of the first section of the valve 186.

It will be appreciated that when the power transformer 140 is first energized a time delay will be introduced before the filaments 194 and 202 of the valve 186 are heated sufficiently to emit sufficient electrons to pass current in the plate circuits of the valve. When the filaments 194 and 202 are heated sufficiently to permit the passing of current in the plate circuits, the anode-cathode circuit of the first section, including the anode 188 and the cathode 190 of the valve 186, conducts current through resistor 210 to render the grid 200 of the second section less negative whereby the anode-cathode circuit of the second section of valve 186 conducts current through resistor 98 to give a voltage thereacross in opposition to the fixed voltage across the section of potentiometer resistor 86 connected between the terminal 88 and the adjustable contact member 94. The opposing voltage of the resistor 98 functions to reduce the positive direct-current bias impressed on the grid cathode circuit of the rectifying valves 22 and 24 from the source or potentiometer resistor 86 to effect a decrease in the current flowing in the field winding 14 of the motor 10 and thereby increase the speed of the motor 10. Such operation effected by the heating of the filaments 194 and 202 is slow depending on the thermal capacity of the filaments of valve 186 with the result that the current flowing through the resistor 98 in the anode-cathode circuit of the second section of valve 186 is slowly increased to effect a gradual decrease in the positive direct-current bias applied to the grids of the rectifying valves 22 and 24 to effect a gradual increase in the speed of the motor 10 to the predetermined voltage which is to be maintained.

Thus when the positive bias resulting from the net unbalance of the voltages controlling the conductivity of valve 110 is first impressed across the resistor 184, the first section of the valve 186 is rendered more conductive to effect an increase in the current flow through the resistor 210 and since such increase is in opposition to the negative grid bias from the potentiometer resistor 86, the second section of the valve 186 is rendered more conducting to pass more current through the resistor 98 to produce a grid biasing potential in opposition to the fixed positive biasing potential of the resistor 86 to further decrease the conductivity of the rectifying valves 22 and 24 and thereby effect an increase in the speed of the motor 10.

Of course, the operation of the valve 186 as just described in response to the initial biasing potential across the resistor 184 is slow, being dependent upon the rate of heating of the filaments 194 and 202 of the valve 186, with the result that any variation in the conductivity of the sections of the valve 186 is slow to effect a gradual change in the speed of the motor 10. By correlating the speed of the motor 10 at which contactor 66 is energized, with the heating characteristics of valve 186, the slow increase in plate current of the second section of valve 186 is such that by the time speed of the motor 10 is increased to the value which is to be maintained, the conductivity of valve 186 is controlled by the unbalance between the output of the tachometer generators 100 and 102.

Thus, when the speed of the motor 10 reaches the predetermined speed which is to be maintained and valve 186 is heated, the voltage across the resistor 170 is equal to the voltage across the resistor 168 which constitutes the reference voltage. Thus the cue voltage across resistor 170 which is a measure of the speed of the motor 10 is equal to the reference voltage resulting from the operation of the tachometer generator 100, the resulting voltages controlling the conductivity of the two sections of the twin triode valve 110 so that the potential drop across resistor 158 equals the potential drop across the resistor 162 with the result that the opposed voltages impressed on the filter circuit 182 are in balance to give a zero voltage across the resistor 184.

Under such conditions, the conductivity of the sections of the twin triode valve 186 is dependent upon the self-biasing action of resistor 222 and the direct-current biasing potential of the potentiometer resistor 86 connected in circuit with the grid 200 to produce a potential drop across the resistor 98 in opposition to the fixed positive biasing potential of the section of potentiometer resistor 86 connected between terminal 88 and contact member 94 to control the conductivity of the rectifier valves 22 and 24 of the power supply to the field winding 14 of the motor 10.

If for any reason the speed of the motor 10 should increase above the predetermined value which is to be maintained, then the alternating-current potential across the resistor 170 increases with respect to the substantially constant reference alternating-current voltage across the resistor 168 with the result that the second section of the valve 110 including the anode 114 and the cathode 118 is rendered more conducting than the first section including the anode 112 and cathode 116, with the result that the voltage across resistor 162 increases with respect to the voltage across resistor 158 so that when impressed upon the filter circuit 182 as described hereinbefore a net resulting voltage is obtained across resistor 184 of a polarity to give a negative biasing potential on the grid 192 of the first section of the valve 186. This negative biasing potential is a direct measure of the departure of the speed of the motor 10 from the predetermined speed and functions to render the first section of the valve 186 including the anode 188 and cathode 190 less conductive whereby the current flow through the resistor 210 is decreased. Such decrease in current through resistor 210 gives a less positive grid biasing potential thereacross in opposition to the negative grid bias from the section of the potentiometer resistor 86 connected between the tap 218 and the movable contact member 226 whereby the negative bias on the grid 200 is increased to decrease the conductivity of the second section of valve 186 including the anode 196 and cathode 198. As the conductivity of the second section is thus decreased, the current flow through the resistor 98 is decreased to effect a decrease in the voltage across resistor 98 in opposition to the fixed positive biasing potential across the section of potentiometer resistor 86 between terminal 88 and the movable contact 94.

By reducing the voltage across resistor 98 in this manner, a more positive direct-current biasing potential is impressed on the grid-cathode circuits of the valves 22 and 24 to effect an increase in the conductivity of the rectifying valves to supply more current to the field winding 14 of the motor 10 and thereby decrease the speed of the motor 10.

It will, of course, be appreciated that the damping transformer 214 connected in the anode-cathode circuit of the first section of valve 186 functions in the normal manner of a damping transformer so that as the field excitation of the field winding 14 is changed, a measure of the rate of change is impressed on the grid control circuit of the second section to modify the output of the second section including the anode 196 and the cathode 198 in anticipation of the changes effected to prevent over-adjustment in the excitation and consequently in the speed of the motor 10.

The operation described hereinbefore is for a normal variation from the predetermined speed of the motor 10. However, if a very rapid change in the speed of the motor 10 is encountered, then the capacitor 230 and resistor 228 coupled in the output circuit of the first section including the anode 188 and cathode 190 of the valve 186 to give a very rapid change in the grid bias of the second section in anticipation of the rapid change in speed of the motor. Thus as the output of the first section of the valve 186 is rapidly increased by reason of a change in the bias of its grid 192 occasioned by the large and rapid unbalance between the reference voltage and the cue voltage, the capacitor 230 is charged and current flows through the resistor 228 to effect a large and rapid change in the grid bias of the second section to change the output of the second section including the anode 196 and cathode 198 of the valve 186 to thereby effectively and quickly change the bias of the rectifier valves 22 and 24. However, for normal operation, only the current flowing in the output circuit of the first section of valve 186 including the resistor 210, affects the bias of the grid 200 to control the output therefrom.

The system of this invention is very effective for obtaining a gradual increase in the speed of the motor 10 to a predetermined speed which is to be maintained and provides for introducing the regulator without effecting accompanying jars or shocks on the systems regulated. After the speed of the motor which is to be maintained is reached, the regulating system is very fast and sensitive in response giving a very close control or regulation of the speed of the motor. For example, when full load is thrown suddenly on a 50 H. P. 600 R. P. M. direct current motor and a drop in speed of 2½% is being encountered, less than one-half second is required to return the speed of the motor to the predetermined speed.

I claim as my invention:

1. In a system for regulating the speed of a motor having armature windings and a field winding, in combination, means disposed for operation to control the field excitation of the motor, a generator disposed for operation to supply the armature windings of the motor, means disposed to be operated when energized, an actuating circuit for said operable means, the actuating circuit being disposed to be established when predetermined field excitation of the generator is obtained, a pair of vacuum valve means disposed for operation only after said operable means is energized, a source of voltage constituting a predetermined reference voltage, and another source of voltage constituting a measure of the speed of the motor, one of the pair of valve means being responsive to said sources of voltage to provide a control voltage that is a measure of unbalance between said sources, the other of the pair of valve means being connected to be responsive to said control voltage to modify the operation of the control means and thereby modify the field excitation of the motor.

2. In a system for regulating the speed of a motor having armature windings and a field winding, in combination, means disposed for operation to control the field excitation of the motor, a generator disposed for operation to supply the armature windings of the motor, a pair of vacuum valve means, means disposed to be operated when energized, an actuating circuit for said operable means, the actuating circuit being disposed to be established when predetermined field excitation of the generator is obtained, said operable means being disposed when energized for connecting each of the pair of valve means to a source of energy, a source of voltage constituting a predetermined reference voltage, and another source of voltage constituting a measure of the speed of the motor, one of the pair of valve means being connected to be responsive to said sources of voltage to provide a control voltage that is a measure of unbalance between said sources, the other of the pair of valve means being connected to be responsive to said control voltage to modify the operation of the control means and thereby modify the field excitation of the motor.

3. In a system for regulating the speed of a motor having armature windings and a field winding, in combination, means disposed for operation to control the field excitation of the motor, a generator disposed for operation to supply the armature windings of the motor, a pair of vacuum valves each having twin anodes, cathodes, grids and heater filaments, means disposed to be operated when energized, an actuating circuit for said operable means, the actuating circuit being disposed to be established when predetermined field excitation of the generator is obtained, said operable means being disposed when energized for connecting the anodes and cathodes of one of the pair of electric valves and the heater filaments of the other of the pair of electric valves to a source of electrical energy, a source of voltage constituting a predetermined reference voltage, another source of voltage constituting a measure of the speed of the motor, said sources being connected in circuit with the grids of said one of the valve means to control the conductivity of the anode-cathode circuits thereof, and means in circuit relation with the anode-cathode circuits of said one of the valve means and with a grid of said other of the valve means for providing a grid potential therefor that is a measure of unbalance between said sources, said grid potential controlling the conductivity of said other valve means to modify the operation of the control means and thereby modify the field excitation of the motor in accordance with the measure of unbalance between said sources.

4. In a system for regulating the speed of a motor having armature windings and a field winding, in combination, means disposed for operation to control the field excitation of the motor, a generator disposed for operation to supply the armature windings of the motor, a pair of vacuum valves each having twin anodes, cathodes, grids and heater filaments, means disposed to be operated when energized, an actuating circuit for said operable means, the actuating circuit being disposed to be established when predetermined field excitation of the generator is obtained, said operable means being disposed when energized for connecting the anodes and cathodes of one of the pair of electric valves and the heater filaments of the other of the pair of electric valves to a source of electrical energy, a source of voltage constituting a predetermined reference voltage, another source of voltage constituting a measure of the speed of the motor, said sources being connected in circuit with the grids of said one of the valve means to control the conductivity of the anode-cathode circuits thereof, means connected in circuit relation with the anode-cathode circuits of said one of the valve means and with a first grid of said other valve means for providing a controlling grid bias therefor that is a measure of unbalance between said sources, the second grid of said other valve means being connected in circuit relation with the first anode-cathode circuit thereof to control the conductivity of the second anode-cathode circuit of said other valve means, said second anode-cathode circuit of said other valve means being connected to modify the operation of the control means and thereby modify the field excitation of the motor in accordance with the measure of unbalance between said sources.

5. In a system for regulating the speed of a motor having armature windings and a field winding, in combination, control means disposed for operation to control the field excitation of the motor, a source of direct current connected to control the operation of the control means, a generator disposed for operation and connected to supply the armature windings of the motor, means disposed for operation to control the excitation of the generator, an electromagnetic means disposed to be energized under predetermined operating conditions of the generator excitation control means, a source of voltage constituting a predetermined reference voltage, another source of voltage constituting a measure of the speed of the motor, vacuum valve means connected in circuit relation with said reference voltage and said speed measuring voltage and disposed to be operated when the electromagnetic means is energized to provide a control voltage that is a measure of unbalance between said reference voltage and said speed measuring voltage, and another vacuum valve means connected in circuit relation with said source of direct current for the control means, said another vacuum means being disposed to be operated in accordance with the unbalance control voltage when the electromagnetic means is energized to modify the operation of the control means and thereby modify the field excitation of the motor.

6. In a system for regulating the speed of a motor having armature windings and a field winding, in combination, means disposed for operation to control the field excitation of the motor, a generator disposed for operation to supply the armature windings of the motor, means disposed to be operated when energized, an actuating circuit for said operable means, the actuating circuit being disposed to be established when predetermined field excitation of the generator is obtained, a pair of vacuum valve means disposed for operation only after said operable means is energized, a source of voltage constituting a predetermined reference voltage, and another source of voltage constituting a measure of the speed of the motor, one of the pair of valve means being responsive to said sources of voltage to provide a control voltage that is a measure of unbalance between said sources, the other of the pair of valve means being connected to be responsive to said control voltage to modify the operation of the control means and thereby modify the field excitation of the motor, and means comprising a damping transformer connected in circuit relation with said other of the pair of valve means and the motor for affecting the operation of said other of the pair of valve means in anticipation of a correction of the speed of the motor.

7. In a system for regulating the speed of a motor having armature windings and a field winding, in combination, means disposed for operation to control the field excitation of the motor, a generator disposed for operation to supply the armature windings of the motor, a pair of vacuum valves each having twin anodes, cathodes, grids and heater filaments, means disposed to be operated when energized, an actuating circuit for said operable means, the actuating circuit being disposed to be established when predetermined field excitation of the generator is obtained, said operable means being disposed when energized for connecting the anodes and cathodes of one of the pair of electric valves and the heater filaments of the other of the pair of electric valves to a source of electrical energy, a source of voltage constituting a predetermined reference voltage, another source of voltage constituting a measure of the speed of the motor, said sources being connected in circuit with the grids of said one of the valve means to control the conductivity of the anode-cathode circuits thereof, means in circuit relation with the anode-cathode circuits of said one of the valve means and with a grid of said other of the valve means for providing a grid potential therefor that is a measure of unbalance between said sources, said grid potential controlling the conductivity of said other valve means to modify the operation of the control means and thereby modify the field excitation of the motor in accordance with the measure of unbalance between said sources, and a damping transformer connected in circuit relation between the motor and an anode-cathode circuit of said other of the valve means for affecting the conductivity of said other valve means in anticipation of a correction of the speed of the motor.

JOSEPH F. KOVALSKY.

REFERENCES CITED

The following references are of record in the file of this patent:

UNITED STATES PATENTS

| Number | Name | Date |
|---|---|---|
| 1,756,573 | Stoller et al. | Apr. 29, 1930 |
| 1,762,999 | Manderfeld | June 10, 1930 |
| 2,229,448 | Garman | Jan. 21, 1941 |
| 2,235,551 | Garman | Mar. 18, 1941 |